July 15, 1969          A. B. RIVETT          3,455,416
VISCOUS CUSHIONING MEANS FOR DISC BRAKES
Filed Jan. 2, 1968          3 Sheets-Sheet 1
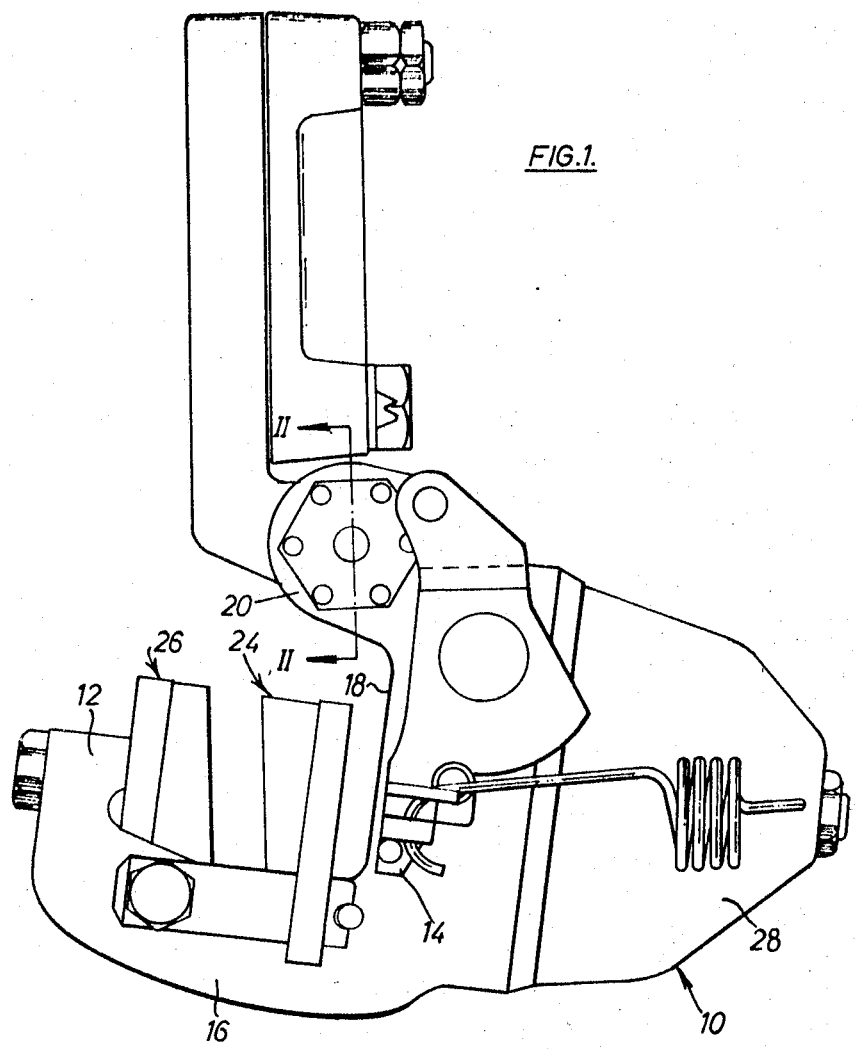
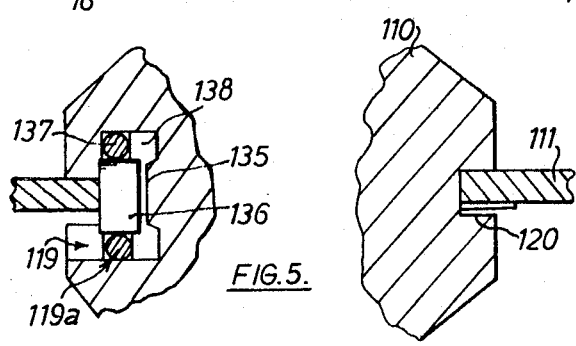

July 15, 1969   A. B. RIVETT   3,455,416
VISCOUS CUSHIONING MEANS FOR DISC BRAKES
Filed Jan. 2, 1968   3 Sheets-Sheet 2

3,455,416
VISCOUS CUSHIONING MEANS FOR DISC BRAKES
Anthony B. Rivett, Marston Green, near Birmingham, England, assignor to Girling Limited, Birmingham, England, a British company
Filed Jan. 2, 1968, Ser. No. 695,085
Int. Cl. F16d 55/224, 65/20
U.S. Cl. 188—73                                6 Claims

ABSTRACT OF THE DISCLOSURE

This invention relates to vehicle disc brake assemblies of the reaction type in which hydraulic piston driven movement of a first friction pad towards one side of a brake rotor sets up a reaction on a movable member carrying a second friction pad serving to bring the second friction pad towards the opposite side of the rotor, and the invention proposes the introduction of a high viscosity silicone fluid or so-called bouncing putty between the said movable part of the brake assembly and a fixed part of the assembly housing the hydraulic piston in order to provide a resilient cushion for abrupt movement set up between the two said parts during brake actuation.

---

This invention concerns mechanical assemblies having relatively movable parts and relates more particularly to means for cushioning relative movement between such movable parts.

In mechanical assemblies having parts which are arranged for movement relative to one another, it sometimes occurs that such movement is abrupt and gives rise to objectionable noise and to accelerated wear in the operation of the assembly. The invention seeks to provide means for cushioning movement of an abrupt nature with a view to reducing the noise and wear otherwise experienced.

According to the present invention, in a mechanical assembly having relatively movable parts with a clearance between them, a high viscosity silicone fluid or so-called bouncing putty material is arranged in said clearance for resiliently cushioning abrupt movement between said parts.

By virtue of this arrangement, when relatively rapid movement takes place between the two parts, they are prevented by the bouncing putty from actually striking one another, so that no objectionable noise results from the relative movement, whilst at the same time the elastic cushioning effect exerted by the bouncing putty reduces the likelihood of accelerated wear.

Figure 2:
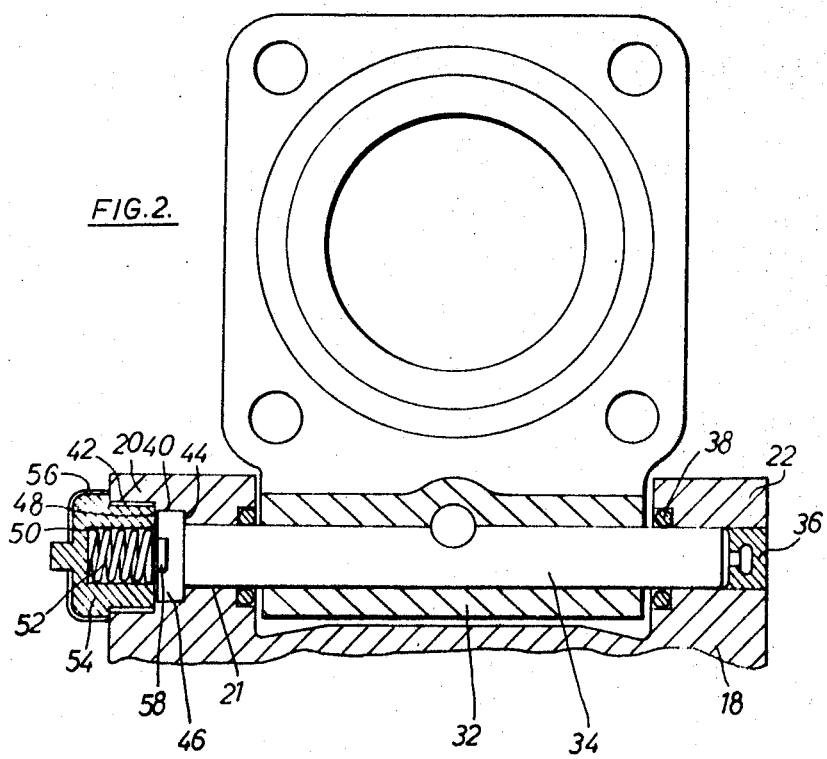
Figure 3:
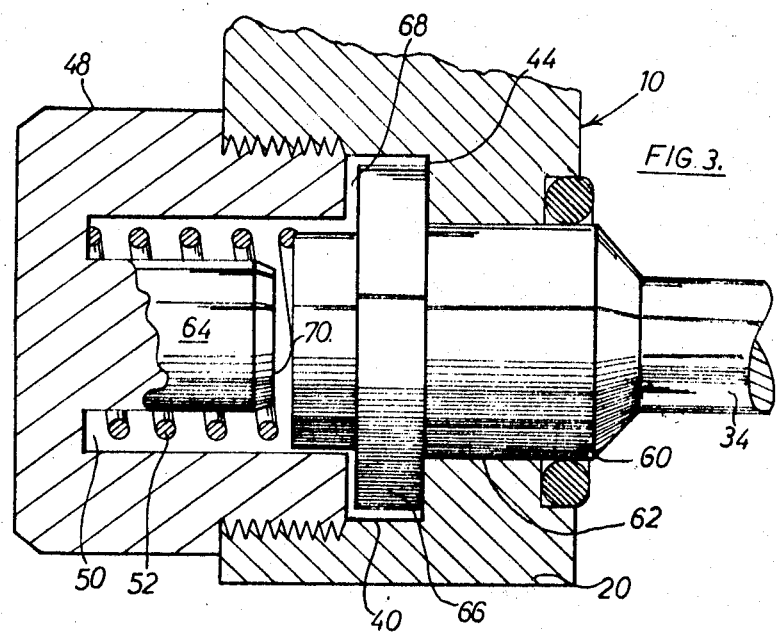
Figure 4:
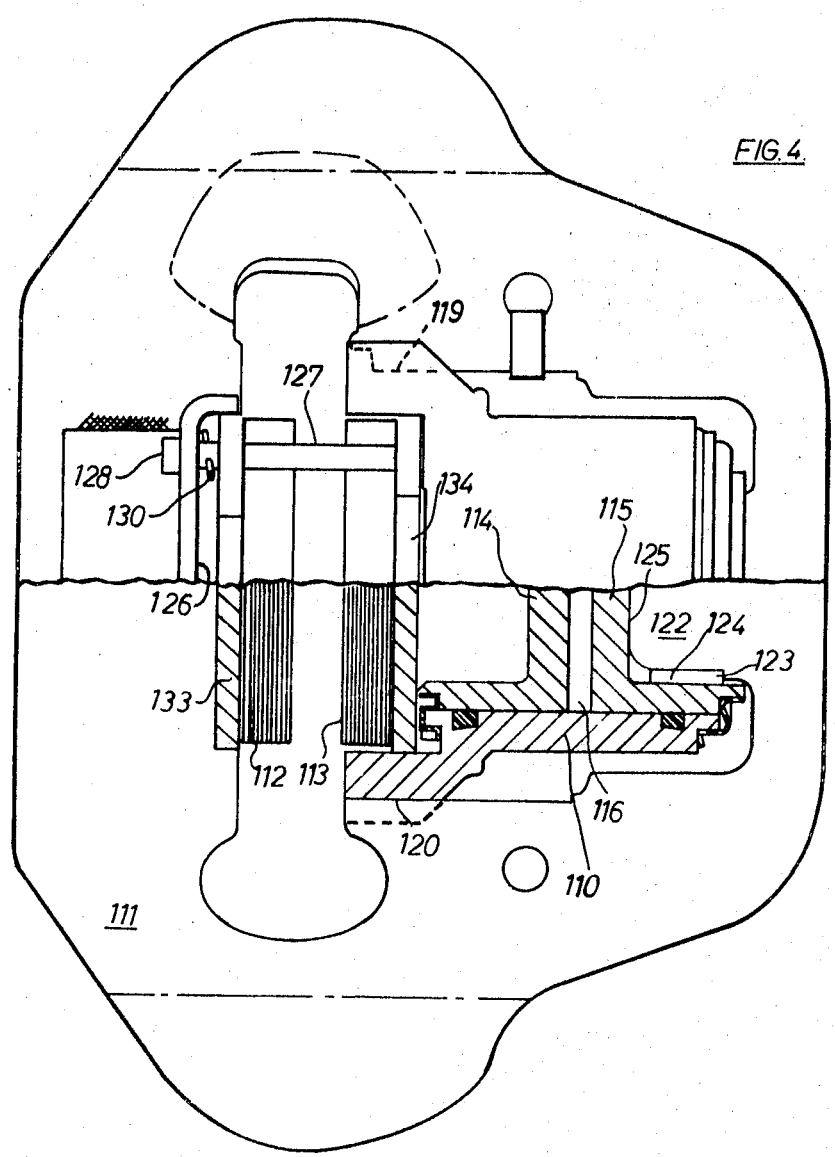

The invention will be described further, by way of example, with reference to the accompanying drawings, in which:

FIG. 1 is an end view of a swinging caliper vehicle disc brake embodying the invention, FIG. 2 is a section taken on the line II—II of FIG. 1, FIG. 3 is a section taken in a plane similar to that of FIG. 2, of a modified hinge pin assembly, FIG. 4 is a plan view, partly in section, of a sliding yoke disc brake embodying the invention, and FIG. 5 is a diagrammatic sectional detail of a part of the brake shown in FIG. 4.

In the disc brake shown in FIGS. 1 and 2 of the drawings, a bifurcated housing or caliper 10 having a front limb 12 and a rear limb 14 connected by a bridge 16 is provided on its rear limb with a radial extension 18 which terminates at its free edge in a pair of spaced eyes or lugs 20 and 22. The rear limb 14 of the caliper carries a directly operated friction pad assembly 24 and the front limb has an indirectly operated friction pad assembly 26, whilst an axially rearwardly extending enlargement 28 on the rear limb 14 contains hydraulic piston and cylinder means (not shown) for directly displacing the friction pad assembly 24 during a braking operation.

The caliper 10 is mounted on a support plate 30 intended for securing to a fixed part of a vehicle and provided along one edge with a bearing portion 32 having a length permitting it to fit between the spaced lugs 20 and 22 on the caliper. A hinge pin 34 is passed through the caliper lugs 20 and 22 and through the bearing portion 32 of the support plate in order pivotally to connect the caliper to the support plate, the hinge pin being keyed to the bearing portion 32 to render it nonrotatable therein. It will be noted that the open end of the caliper lug 22 is closed by a rubber plug 36 and that a seal 38 is provided to prevent dirt from entering the bearing surfaces of the hinge pin and the lug.

The caliper lug 20, in addition to the bore 21 through which the hinge pin passes, is also formed with a first counterbore 40 and with a second and larger diameter counterbore 42, a shoulder 44 being defined between the bore 21 and counterbore 40. The hinge pin has a head 46 which is received in the counterbore 40, while a plug 48 is screwed into the counterbore 42. The plug 48 is formed from its inner end with a central blind bore 50 wherein is located a compression spring 52 arranged to bear against the head 46 of the hinge pin, the outer end of the plug being in the shape of a hexagonal head 54 carrying a lock cap 56, the edges of which bite into the lug 20 when the plug is tightened, thereby to prevent the plug from unscrewing.

The head 46 of the hinge pin is formed with a central recess 58 and, during assembly of the brake, a quantity of so-called bouncing putty silicone material is placed over the recess 58 before the plug 48 is inserted in the counterbore 42. In use, the brake is mounted on a vehicle with the axis of the hinge pin almost vertical and the compression spring 52 pushes the caliper 10 upwards against the action of gravity to maintain the shoulder 44 in the lug 20 in contact with the underside of the pin head 46. The bouncing putty takes up a shape filling the recess 58, entering the clearance normally maintained by the spring 52 between the head 46 of the pin and the lower face of the plug 48 and passing to some slight extent inside the internal recess 50 of the plug. This is because the bouncing putty has the property of flowing somewhat under the effect of gravity, and during a prolonged period of time. With the particular caliper mounting arrangement described, during forward braking the drag on the caliper is in an upward direction and is transferred to the hinge pin by the shoulder 44 of the lug 20, which as already mentioned is normally maintained in contact with the hinge pin head by the spring 52. The spring also therefore maintains a clearance between the top side of the hinge pin head and the lower face of the plug 48, with the result that, during reverse braking, the caliper tends to take up this clearance very rapidly, resulting in a sharp noise and in considerable wear in the contacting faces in the absence of the cushion provided by the bouncing putty. The latter, however, during an abrupt movement of this nature acts as a resilient washer or buffer between the plug 48 and the pin head 46, the putty being resilient but resistant to rapid deformation. After being subjected to this load during reverse braking and after being squeezed to some extent out from beneath the top face of the pin head 46 and the opposed face of the plug 48, the bouncing putty tends under the action of gravity to flow somewhat in liquid fashion slowly back to the space between them when the caliper 10 returns to its normal position under the action of the compression spring 52.

Due to its ability to flow slowly under gravity, when the brake is not in use or when it is used during forward braking, the bouncing putty tends to level out and to flow downwardly. It has difficulty in flowing down through the small clearance between the hinge pin 34 and the bore 21 of the lug 20 and therefore it is largely retained in the recess 58 of the pin head and in the aforementioned clearance between that head and the plug 48. However, provision may be made for deliberately introducing bouncing putty into the clearance between the pin and the lugs 20 and 22 and a small quantity of bouncing putty may also be introduced between the rubber plug 36 and the adjacent end of the pin 34. Bouncing putty in these particular clearances is useful since the caliper tends to rotate with the disc or other brake rotor when the brake is applied and this creates radial takeup of clearance between the hinge pin and the bores in the caliper lugs 20 and 22, where a similar cushioning effect is desirable. Moreover, although the brake described herein represents a mechanism mounted in a vertical condition, the invention may also be employed with horizontally mounted assemblies by providing suitable retaining diaphragms or equivalent members to constrain the putty to remain in a required location, or alternatively by using a retainer having interstices or pockets in which the putty is held.

The modification shown in FIG. 3 differs from the construction of FIG. 2 principally in that the hinge pin 34 terminates in an elongated and enlarged diameter head 60 received in a correspondingly dimensioned bore 62 of the lug 20 and that the plug 48 closing the counterbore 40 is provided with an axial spigot 64 which opposes the end of the head 60 and also acts to stabilize and guide the spring 52. When the brake is fitted to a vehicle, the pin axis is again intended to be vertical, or substantially so, as already described, so that the spring 52 urges the caliper 10 upwards against the action of gravity and maintains the shoulder 44 in the lug 20 in contact with a collar 66 encircling the head 60 adjacent its end. The depth of entry of the plug 48 is so arranged that under these circumstances, a small hinge clearance 68 remains between the inner or lower end face of the plug and the collar 66. A much larger clearance 70 is left between the spigot 64 and the opposed end of the hinge head 60 and is filled with bouncing putty, which also occupies a part of the recess 50, serving as a reservoir. The operation of this embodiment of the invention is identical to that of FIG. 2.

In the foregoing description and in the claiming clauses hereof, the term "bouncing putty" is intended to mean a silicone bouncing putty such as results when silicone fluid is polymerized with ferric chloride in the presence of boric acid or other hydroxy compounds. Although such a putty will flow slowly at room temperatures, when subjected to sudden compressive forces it can exhibit a coefficient of restitution of 0.8 and seldom one less than 0.3.

Referring now to FIGS. 4 and 5 of the drawings, a spot type disc brake of sliding yoke or caliper construction comprises a body member 110, a yoke 111 adapted to support an indirectly operated pad 112 and a hydraulic actuator formed within the body member 110 and operative between the yoke 111 and a directly operated pad 113. The hydraulic actuator comprises a pair of opposed pistons 114 and 115 slidable within a cylinder 116 constituted by a through bore 117 in the body member 110.

The body member 110 is adapted to be bolted to a torque plate or other fixed part of the wheel mounting (not shown) adjacent a disc (also not shown) so that the disc periphery extends between the pads 112, 113. The body member 110 has a pair of longitudinal grooves 119, 120 formed at opposite sides thereof, in which grooves the inside edges of the yoke 111 are guided with clearance. The yoke 111 is also located in the piston 115 by an inwardly extending tongue 122 formed integrally with the yoke and supported by a ring-like insert member 123 in a blind bore 124 in the piston 115. The base 125 of the blind bore 124 abuts the end of the tongue 122 to transmit the hydraulically produced force acting on the piston 115 to the yoke 111 and so to the indirectly operated pad 112.

A bracket 126 is secured to the yoke 111 adjacent the pad 112 and supports a pair of pad-retaining pins 127 whose other ends are slidably received in suitable bores in the body member 110. The pins 127 have heads 128 to prevent the pins passing right through the bracket 126 and clips 130 hold the pins 127 captive on the brackets 126. Lugs 131 and 132 formed on backing plates 133 and 134 respectively on the pads 112 and 113 have apertures through which pass the pins 127 whereby the pads 112 and 113 are suspended and located in their appropriate positions.

In accordance with the invention, and as more particularly evident from FIG. 5, the slot 119 includes a local recess 119a wider than the remainder of that slot and having a boss 135 upstanding from its base. The slot 119 is preferably that which is on the trailing side of the brake viewed with respect to the normal, forward direction of rotation of the brake disc. The edge of the yoke 111 engaging in the slot 119 carries a thrust pad 136 which is embraced by a sealing ring 137 and the thrust pad and sealing ring together cooperate with the recess 119a to define a compartment 138 which is filled with bouncing putty. The confronting surfaces of the boss 135 and the thrust pad 136 are normally spaced apart, so that the bouncing putty fills the gap between them. In the operation of the brake shown in FIGS. 4 and 5, therefore, for braking in the normal forward direction of disc rotation the yoke 111 has permanent abutting engagement with the base of the slot 120 located at the leading side of the brake. However, when braking takes place in the reverse direction, any abrupt movement of the yoke 111 which the disc may tend to cause is opposed by the bouncing putty in the compartment 138.

I claim:

1. A vehicle disc brake assembly comprising support means including a first part adapted for securing to a fixed part of a vehicle wheel mounting adjacent a path described by a brake rotor and a second part movable relative to said first part, a pair of opposed brake pads mounted on said support means, brake actuator means in said support means for directly displacing one of said brake pads towards the brake rotor path, at least the other of said brake pads being mounted in the movable part of said support means and a quantity of high viscosity silicone fluid constituting a bouncing putty material interposed and confined between said first and second parts of said support means for resiliently cushioning abrupt movement set up between said parts in consequence of the application of braking torque to the movable one of said parts, said movable part of said support means comprising a caliper member and including a body portion, a pair of spaced limbs respectively carrying said brake pads and a bridge piece joining said limbs and merging behind one of said limbs into said body portion, hinge means connecting the movable part of said support means to the fixed part thereof, said hinge means comprising aligned hinge eyes in the two parts of the support means and a hinge pin engaged in said eyes, hydraulic piston and cylinder means in said body portion and constituting said actuator means, one end region of said hinge pin presenting an axially directed thrust surface, and an end closure closing the axial end of the hinge eye accommodating said end region of said hinge pin, said thrust surface cooperating with said end closure to define a space for receiving said bouncing putty material.

2. A vehicle disc brake assembly as set forth in claim 1, comprising a pair of spaced aligned lugs on said caliper member and a portion on said fixed part of said support means fitting between said lugs, said lugs and said support means portion being formed with aligned bores constituting said hinge eyes, an axially recessed plug serving as said end closure and closing the bore of the lug accommodating the thrust surface of the hinge pin, a head on said pin presenting said thrust surface, said last-mentioned bore being counter-bored to receive said head and to define a shoulder between said bore and the counterbore, and a spring in said plug recess arranged to bear on said head for urging the same against said shoulder.

3. A vehicle disc brake assembly as set forth in claim 1, further comprising a pair of spaced aligned lugs on said caliper member and a portion on said fixed part of said support means fitting between said lugs, said lugs and said support means portion being formed with aligned bores constituting said hinge eyes, an axially recessed plug serving as said end closure and closing the bore of the lug accommodating the thrust surface end of the hinge pin, an enlarged diameter collar adjacent but set back from said thrust surface end, said last-mentioned bore being counterbored to receive said collar and to define a shoulder between said bore and said counterbore, an axial spigot in the plug recess and confronting said thrust surface end of said pin, and a spring engaged over said spigot for urging said pin in a direction to abut said collar against said shoulder.

4. A vehicle disc brake assembly comprising support means including a first part adapted for securing to a fixed part of a vehicle wheel mounting adjacent a path described by a brake rotor and a second part movable relative to said first part, a pair of opposed brake pads mounted on said support means, brake actuator means in said support means for directly displacing one of said brake pads toward the brake rotor path, at least the other of said brake pads being mounted in the movable part of said support means and a quantity of high viscosity silicone fluid constituting a bouncing putty material interposed and confined between said first and second parts of said support means for resiliently cushioning abrupt movement set up between said parts in consequence of the application of braking torque to the movable one of said parts, said fixed part of said support means being a hydraulic piston and cylinder combination also constituting said actuator means and a yoke member constituting the movable part of said support means and slidable on said piston and cylinder combination, said bouncing putty material being accommodated in the sliding connection between said yoke and said combination.

5. A disc brake assembly as set forth in claim 4, said yoke being formed with an aperture presenting laterally spaced, parallel edge regions, said piston and cylinder combination being formed with grooves for receiving said edge regions to establish said sliding connection, one of said grooves being locally enlarged to define a local recess therein for receiving said bouncing putty material, and a thrust pad on one of said edge regions and accommodated in said local recess for cooperating with said bouncing putty material.

6. A disc brake assembly as set forth in claim 5, further comprising a raised boss on the base of said local recess and confronting said thrust pad, and a seal peripherally embracing said thrust pad and cooperating with the walls of said recess to retain said putty therein.

References Cited

UNITED STATES PATENTS

| | | | |
|---|---|---|---|
| 2,533,186 | 12/1950 | Bricker et al. | 188—73 |
| 2,830,833 | 4/1958 | Alldredge et al. | |
| 3,137,370 | 6/1964 | Lepelletier | 188—73 X |
| 3,181,654 | 5/1965 | Peres | 188—73 |
| 3,245,500 | 4/1966 | Hambling et al. | 188—73 |
| 3,254,741 | 6/1966 | Greene | 188—100 |
| 3,260,332 | 7/1966 | Wells | 188—73 |

GEORGE E. A. HALVOSA, Primary Examiner

U.S. Cl. X.R.

188—205